(12) United States Patent
Frutschi

(10) Patent No.: US 6,178,738 B1
(45) Date of Patent: Jan. 30, 2001

(54) METHOD OF OPERATING A GAS-TURBINE GROUP BY DIRECTING A FUEL/WATER MIXTURE TO THE COMBUSTION CHAMBER

(75) Inventor: Hans Ulrich Frutschi, Riniken (CH)

(73) Assignee: Asea Brown Boveri AG, Baden (CH)

(*) Notice: Under 35 U.S.C. 154(b), the term of this patent shall be extended for 0 days.

(21) Appl. No.: 09/208,440

(22) Filed: Dec. 10, 1998

(30) Foreign Application Priority Data

Dec. 17, 1997 (EP) .................................................. 97810992

(51) Int. Cl.[7] .................................. F02C 7/00; F02G 3/00
(52) U.S. Cl. ........................ 60/39.05; 60/39.17; 60/39.59
(58) Field of Search ..................... 60/39.04, 39.05, 60/39.12, 39.141, 39.17, 39.53, 39.59, 736

(56) References Cited

U.S. PATENT DOCUMENTS

| | | | |
|---|---|---|---|
| 3,895,488 | * 7/1975 | Koch | 60/39.46 |
| 4,866,928 | * 9/1989 | Raiko | 60/39.05 |
| 5,095,693 | * 3/1992 | Day | 60/39.59 |
| 5,233,823 | 8/1993 | Day . | |
| 5,617,716 | 4/1997 | Schreiber et al. . | |
| 5,983,622 | * 11/1999 | Newburry et al. | 60/39.05 |

FOREIGN PATENT DOCUMENTS

| | | |
|---|---|---|
| 0676532A1 | 10/1995 | (EP) . |
| 2119447 | 11/1983 | (GB) . |
| WO92/19701 | 11/1992 | (WO) . |

* cited by examiner

*Primary Examiner*—Charles G. Freay
(74) *Attorney, Agent, or Firm*—Burns, Doane, Swecker & Mathis, L.L.P.

(57) ABSTRACT

In a method of operating a gas-turbine group, an exhaust-gas flow (9) of the gas-turbine group is admitted to a heat-exchange stage (14, 18), through which a liquid fuel (12) and a water quantity (16) flow. The thermally processed media (12, 16) are then brought together, whereby an emulsion (19) is formed, and this emulsion (19) is used to operate a burner of a combustion chamber. In this way, the spraying of this very hot emulsion (19) into the combustion air ensures good mixing.

6 Claims, 2 Drawing Sheets

METHOD OF OPERATING A GAS-TURBINE GROUP BY DIRECTING A FUEL/WATER MIXTURE TO THE COMBUSTION CHAMBER

BACKGROUND OF THE INVENTION

1. Field of the Invention

The invention relates to a method of operating a gas-turbine group.

2. Discussion of Background

Premix burners of the newer generation, for example for the operation of a combustion chamber of a gas turbine, are able to ensure efficient and low-pollution combustion when using a gaseous fuel. The use of a liquid fuel results in shortcomings which are connected with the very high vaporization temperature of such fuels. Depending on the proportion of non-volatile fractions in these fuels, residues form during the vaporization of these fuels and may lead to coke in the limit case. There is also the fact that the very high pressure level required for the admission to gas-turbine burners increases the vaporization temperature even further. Even the vaporization of fuel oils under partial-pressure conditions does not bring about any lasting change in this situation, so that it may be assumed that the operation of a premix burner with superheated oil vapor cannot be taken into consideration.

SUMMARY OF THE INVENTION

Accordingly, one object of the invention, as defined in the claims, in a method of the type mentioned at the beginning, is to propose novel measures which permit the operation of a premix burner with liquid fuels. In this case, according to the invention, a liquid fuel, preferably oil, is preheated to a maximum of 150–200° C. and directed into a flow of hot pressurized water as close to the saturation temperature as possible. This emulsion is then used for the operation of a premix burner, as disclosed by EP-0 321 809 B1 (corresponding to U.S. Pat. No. 4,932,861) or EP-0 780 629 A2 (corresponding to U.S. Pat. No. 5,735,687), the last-mentioned patents being an integral part of the present description.

A further method according to the invention provides for the spray of the liquid fuel, which is preheated to as high a degree as possible, to be directed into a flow of highly superheated steam. The latter functions as a carrier gas for the fuel mist, so that the mixture in the case of a premix burner can be directed via the nozzles provided for a gaseous fuel.

The essential advantages of the invention may be seen in the fact that the atomization of the very hot fuel/water emulsion guarantees the generation of the finest possible mist, which can be readily mixed with the hot combustion air. This enables the injection plane inside the premix burner to be shifted further downstream, so that the flame formation upstream in the interior of the burner, which flame formation is feared on account of the high ignition quality of the liquid fuel, is suppressed without inadequate combustion having to be tolerated.

Advantageous and expedient further developments of the achievement of the object according to the invention are defined in the further claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
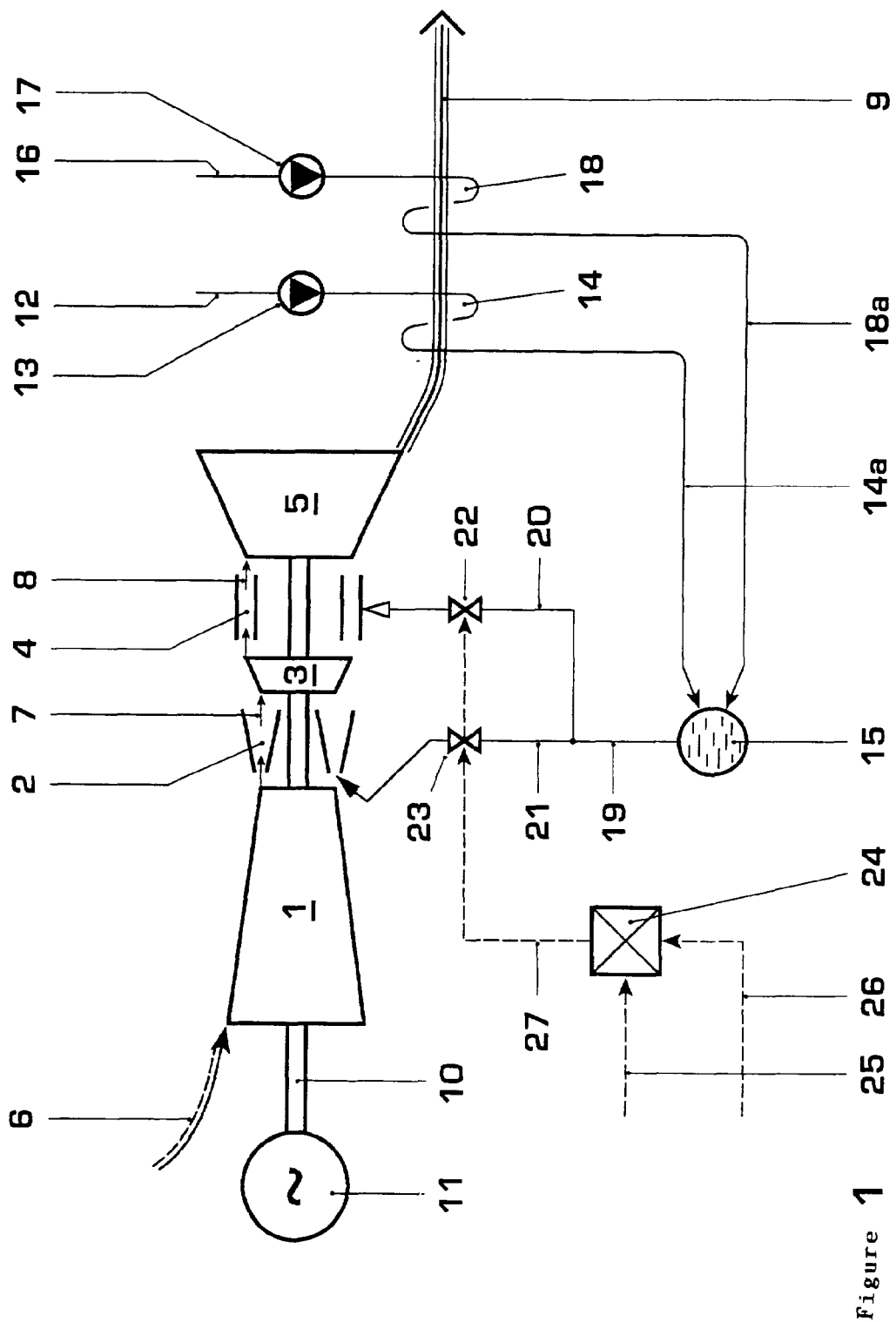
FIG. 1 shows a gas-turbine group with provision of a liquid fuel for the operation of a premix burner.

Referring now to the drawings, wherein like reference numerals designate identical or corresponding parts throughout the several views, all the features which are not essential for the direct understanding of the invention have been omitted, and the direction of flow of the media is indicated by arrows, FIG. 1 shows a gas-turbine group which is connected with a circuit for the processing of a liquid fuel for the operation of a premix burner, preferably according to EP-0 321 809 B1 or EP-0 780 629 A2. The subject matter of EP-0 321 809 B1 corresponds to U.S. Pat. No. 4,932,861, which is hereby incorporated by reference. The subject matter of EP-0 780 629 A2 corresponds to U.S. Pat. No. 5,735,687, which is hereby incorporated by reference. This gas-turbine group has a compressor unit 1 in which the compression of the intake air 6 takes place. The air which is thus compressed then flows into a first combustion chamber, a high-pressure combustion chamber, HP combustion chamber 2, in which the initial generation of hot gas is provided with the aid of a fuel. Operating downstream of this HP combustion chamber 2 is a first turbine, a high-pressure turbine, HP turbine 3, in which the hot gases 7 provided in the HP combustion chamber 2 undergo a partial expansion. This partial expansion is characterized by the fact that the partly expanded hot gases from the HP turbine 3 still have a relatively high temperature, in the order of magnitude of 1000° C. and above. Accordingly, said HP turbine 3 consists of few moving-blade stages, preferably 1–3 stages. Acting downstream of this HP turbine 3 is a second combustion chamber, a low-pressure combustion chamber, LP combustion chamber 4, which functions according to a self-ignition principle. This LP combustion chamber 4 essentially has the form of an annular duct through which flow occurs and into which a fuel suitable for initiating a self-ignition is injected. When the temperature of the partly expanded hot gases from the HP turbine 3 is at said temperature level, a self-ignition of the injected fuel takes place in the LP combustion chamber 4. This LP combustion chamber 4 has flow aids (not shown) which effect a stabilizing backflow in the region of the flame front in order to ensure a reliable combustion operation. The partly expanded hot gases are therefore processed again in the LP combustion chamber 4 to form high-grade hot gases 8, the temperature of which corresponds approximately to that of the HP combustion chamber 2. In principle, the temperatures of the hot gases 7, 8 are not directly limited; this limit is instead predetermined primarily by the turbine to which the gases are admitted and by its machine elements. The hot gases 8 are then admitted to a second turbine, a low-pressure turbine, LP turbine 5, in which the final expansion first takes place. The residual thermal potential of the exhaust gases 9 is then used for further purposes. A generator 11 provides for the generation of electricity from the output of the two turbines 3, 5. An essential feature of the gas-turbine group shown is the uniform bearing arrangement of all the fluid-flow machines 1, 3, 5 on a continuous shaft 10, which is preferably supported on two bearings (not shown). The two combustion chambers 2, 4 occupy the intermediate space between the two turbines 3, 5, in which case the HP combustion chamber 2 is preferably designed as an annular combustion chamber and can largely be combined with the compressor unit 1 in such a way that this measure essentially helps to make the gas-turbine group into a compact unit. This possibility cannot be fully realized for fluidic reasons relating to the LP combustion chamber 4; nonetheless, it may be said here that the last-mentioned combustion chamber turns out to be very short, so that the intended aim of realizing a compact gas-turbine group is entirely achieved. In connection with the further configuration of this gas-turbine group, reference is made to EP-0 620 362 A1, this publication forming an integral part of the present description.

The exhaust gases 9 flow through a heat-exchange system 14, 18, through which two different media 12, 16 flow, and these media 12, 16 undergo thermal processing. A flow of cold liquid fuel 12, preferably oil, is directed by a feed pump 13 into the heat-exchange stage 14 and undergoes thermal processing there in the sense that a hot oil quantity 14a is provided here. In parallel with this, processed water 16 is likewise directed by a feed pump 17 into the heat-exchange stage 18 and is thermally enhanced there to form hot water 18a. The two thermally processed media 14a, 18a flow into a drum 15 in which an emulsion 19 arises. This emulsion 19 then splits up into two flows 20, 21. Via one associated control element 22, 23 each, the hot emulsion flows 20, 21 are directed to the two combustion chambers 2, 4. The atomization of these hot emulsions 20, 21 which takes place there in the burners or injection means (cf. EP-0 620 362 A1) guarantees the generation of the finest possible mist, which can be readily mixed with the hot combustion air. This enables, for example, the injection plane inside a premix burner according to EP-0 321 809 B1 or EP-0 780 629 A2 to be shifted further downstream, so that the flame formation upstream in the interior of the burner, which flame formation is feared on account of a high ignition quality of the liquid fuel, is suppressed without inadequate combustion having to be tolerated. A control system 24, which is fed with various parameters such as pressure 25, temperature 26, etc., meters the fuel feed to the two combustion chambers 2, 4 according to predetermined desired values via a signal 27.

The function of the heat exchangers 14, 18 which is described here may also occur in interaction with the compressor stage 1, specifically by these heat exchangers 14, 18 being arranged upstream or downstream of its outlet.

Figure 2:
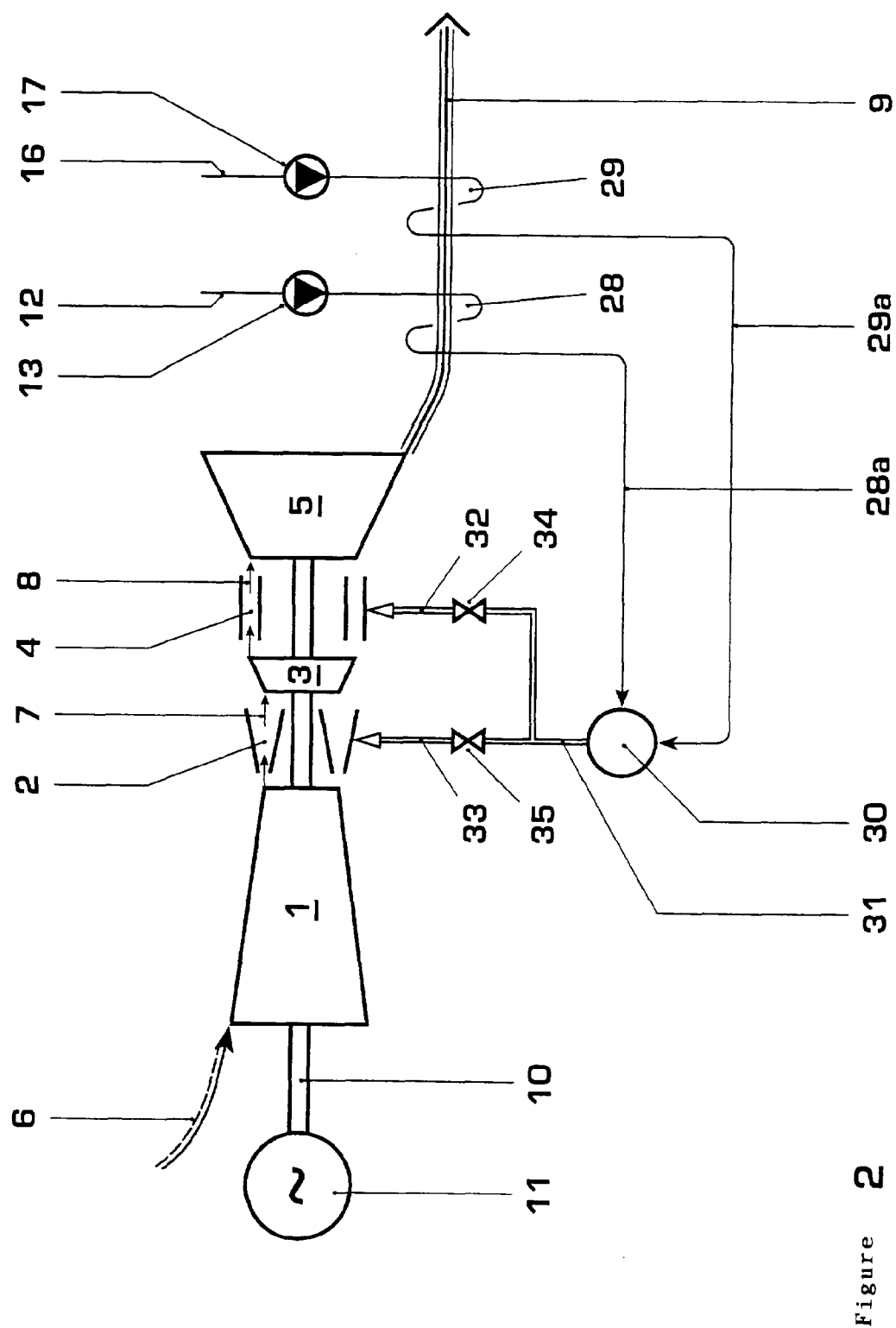
FIG. 2 shows the same gas-turbine group with further provision of a liquid fuel for the operation of a premix burner.

In the circuit according to FIG. 2, the gas-turbine group is the same as under FIG. 1. The two media thermally processed in the heat-exchange stages 28, 29, namely superheated steam 29a of high temperature and the hot oil 28a, are directed into a mixer 30, in which the hot oil 28a is sprayed into the superheated steam 29a in such a way that the superheated steam/oil-mist mixture 31 now developing has the quality of a low-calorific fuel (MBTU gas, LBTU gas), which in turn is directed via lines 32, 33, backed up by corresponding control elements 34, 35, to the respective combustion chambers 2, 4. DE-195 02 796 A1 discloses a premix burner for operation with such a fuel, this burner forming an integral part of the present description. The metering of the fuel feed also takes place here with the aid of a control system (no longer shown in any detail).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a gas-turbine group, comprising the steps of:

provindig a compressor unit, at least one combustion chamber, at least one turbine and a generator;

operating said at least one combustion chamber with the aid of a burner composed of a combustion-air-swirled premix section;

admitting a gas flow from the gas-turbine group to a heat-exchange stage, wherein a liquid fuel and a water quantity flow through this heat-exchange stage and are subjected to thermal processing there;

forming an emulsion with the hot liquid fuel and the hot water; and operating the burner of the combustion chamber with the emulsion.

2. The method as claimed in claim 1, wherein the gas-turbine group is operated according to sequential firing.

3. The method as claimed in claim 1, wherein exhaust gases of the turbine are admitted to the heat-exchange stages.

4. The method as claimed in claim 1, wherein an air flow from the compressor sage is admitted to the heat-exchange stages.

5. A method of operating a gas-turbine group, comprising the steps of:

providing a compressor unit, at least one combustion chamber, at lest one turbine and a generator;

operating said at least one combustion chamber with the aid of a burner composed of a combustion-air-swirled premix section;

admitting a gas flow from the gas-turbine group to a heat-exchange stage, wherein a liquid fuel and a water quantity flow through this heat-exchange stage and are subjected to thermal processing there;

directing the hot fuel into superheated steam generated from the water; and operating the burner of the combustion chamber with this fuel/steam mixture.

6. The method as claimed in claim 5, wherein the fuel/steam mixture is directed as low-calorific fuel into the burner of the combustion chamber.

\* \* \* \* \*